Figure 1:
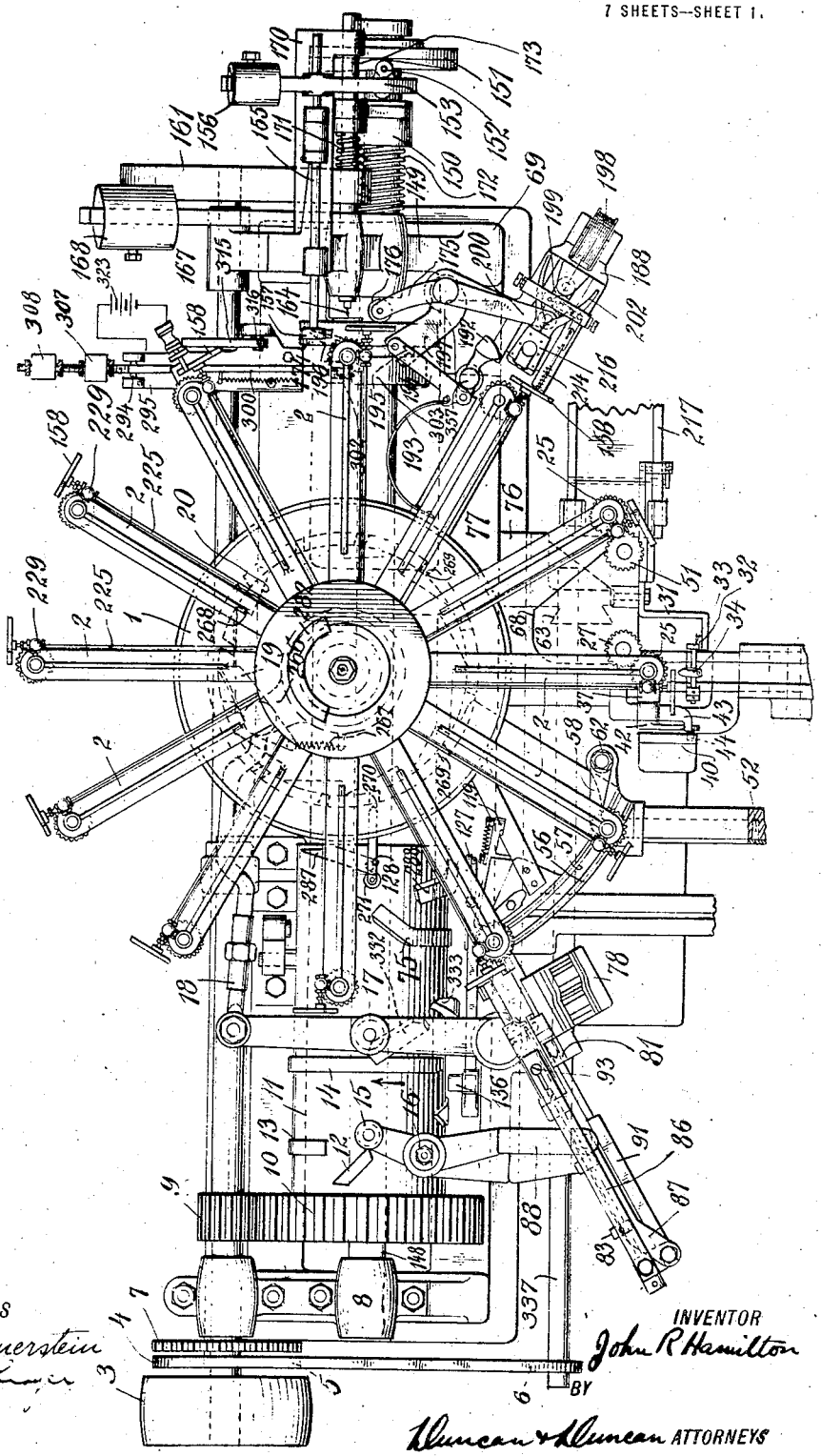

J. R. HAMILTON.
MACHINE FOR ASSEMBLING AUTOMATIC SPRINKLER HEADS.
APPLICATION FILED APR. 6, 1912. RENEWED MAY 27, 1916.

1,206,107.

Patented Nov. 28, 1916.
7 SHEETS—SHEET 1.

WITNESSES
Leonard Hauerstein
Albert E. _____

INVENTOR
John R Hamilton
BY
Duncan & Duncan ATTORNEYS

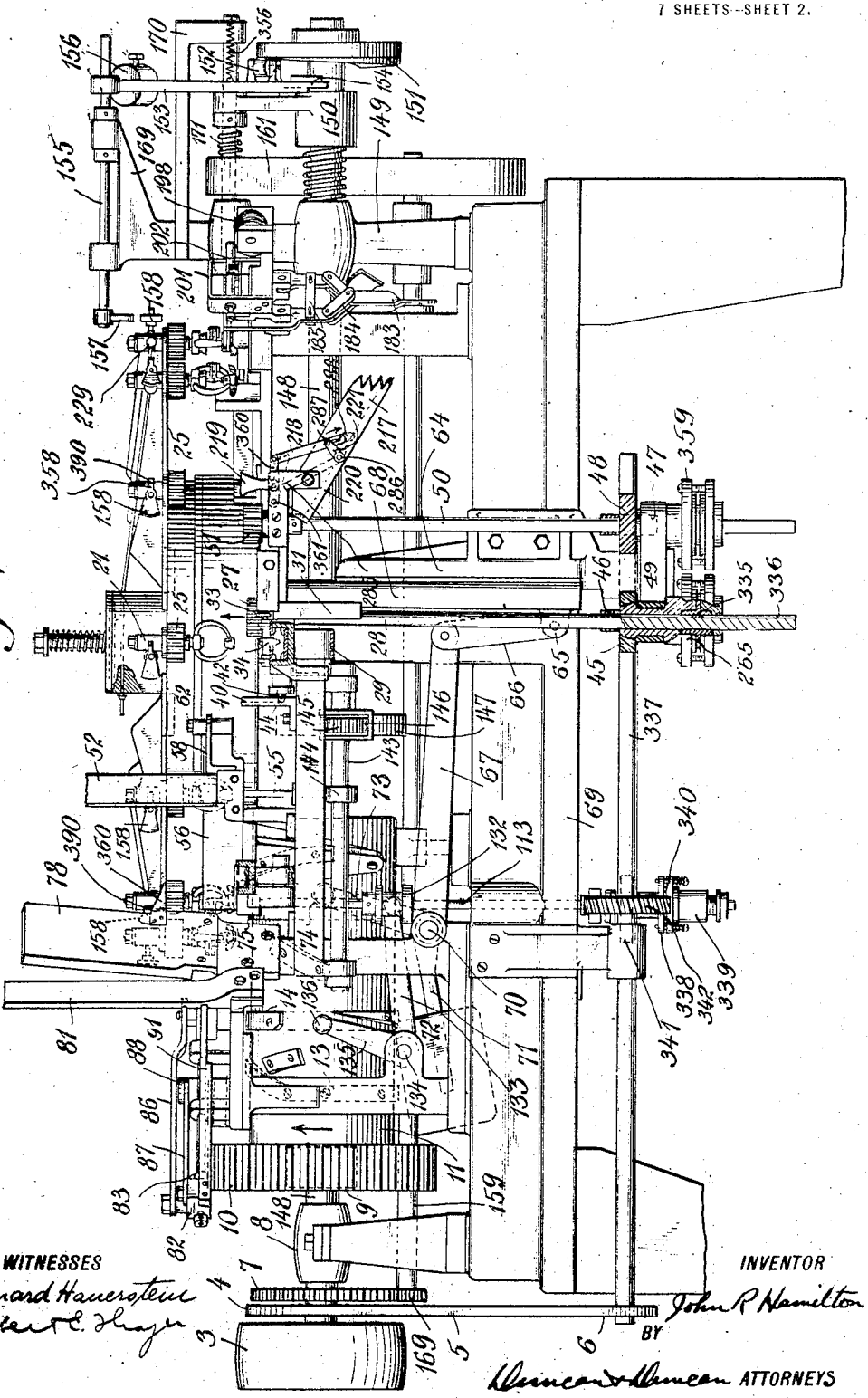

J. R. HAMILTON.
MACHINE FOR ASSEMBLING AUTOMATIC SPRINKLER HEADS.
APPLICATION FILED APR. 6, 1912. RENEWED MAY 27, 1916.
1,206,107.
Patented Nov. 28, 1916.
7 SHEETS—SHEET 3.
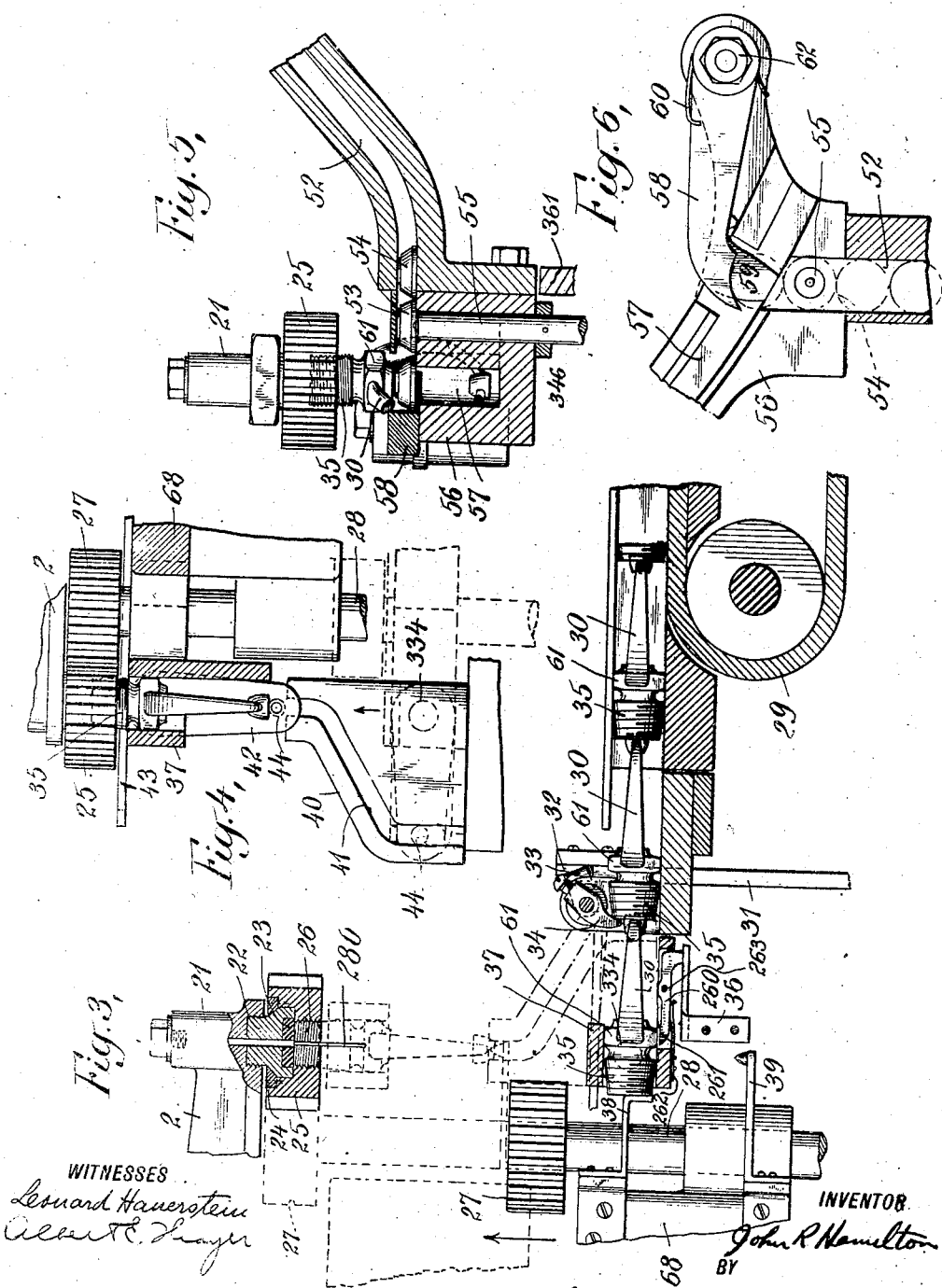
WITNESSES
Leonard Hauerstein
Albert E. Thayer
INVENTOR
John R. Hamilton
BY
Duncan & Duncan ATTORNEYS

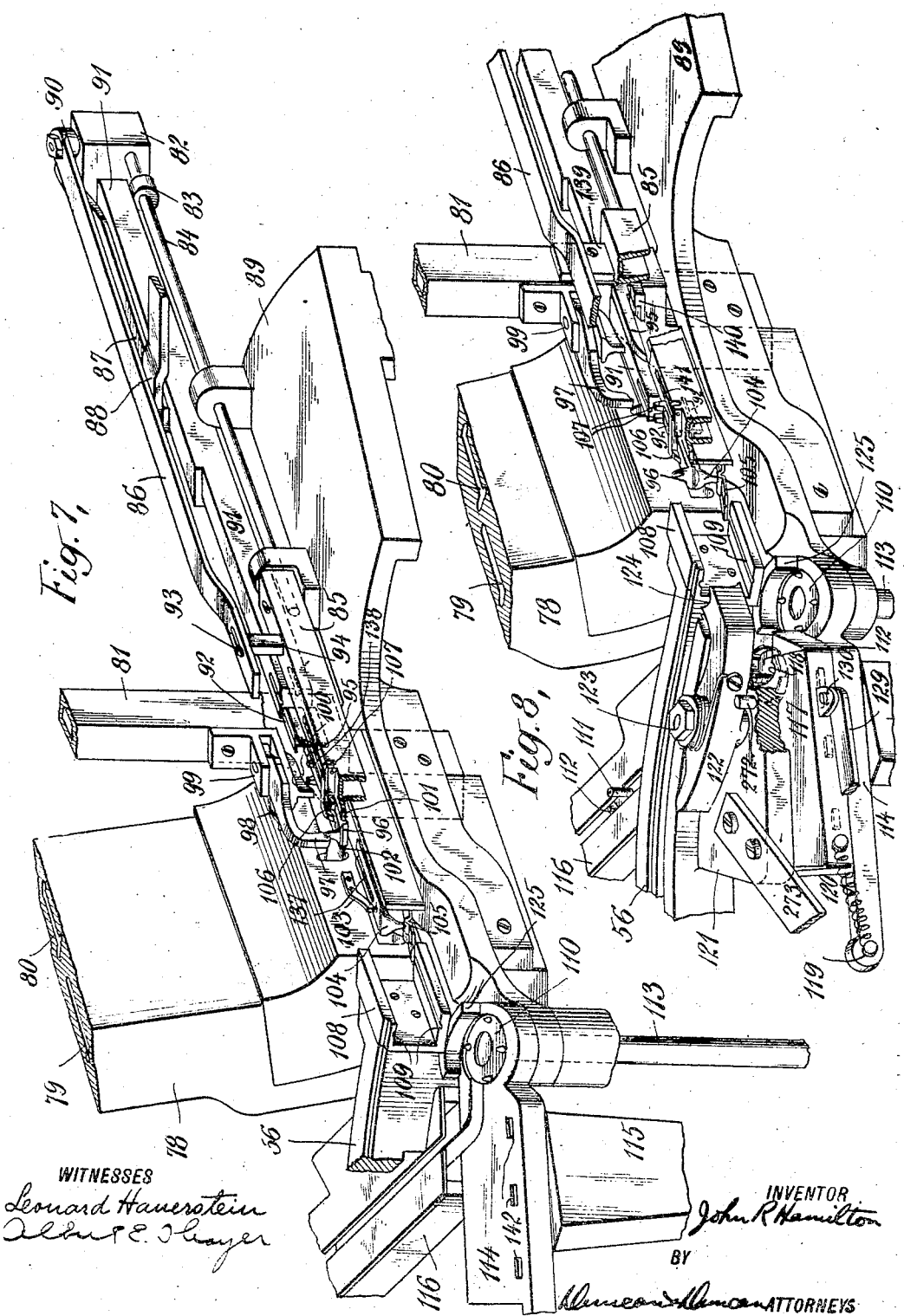

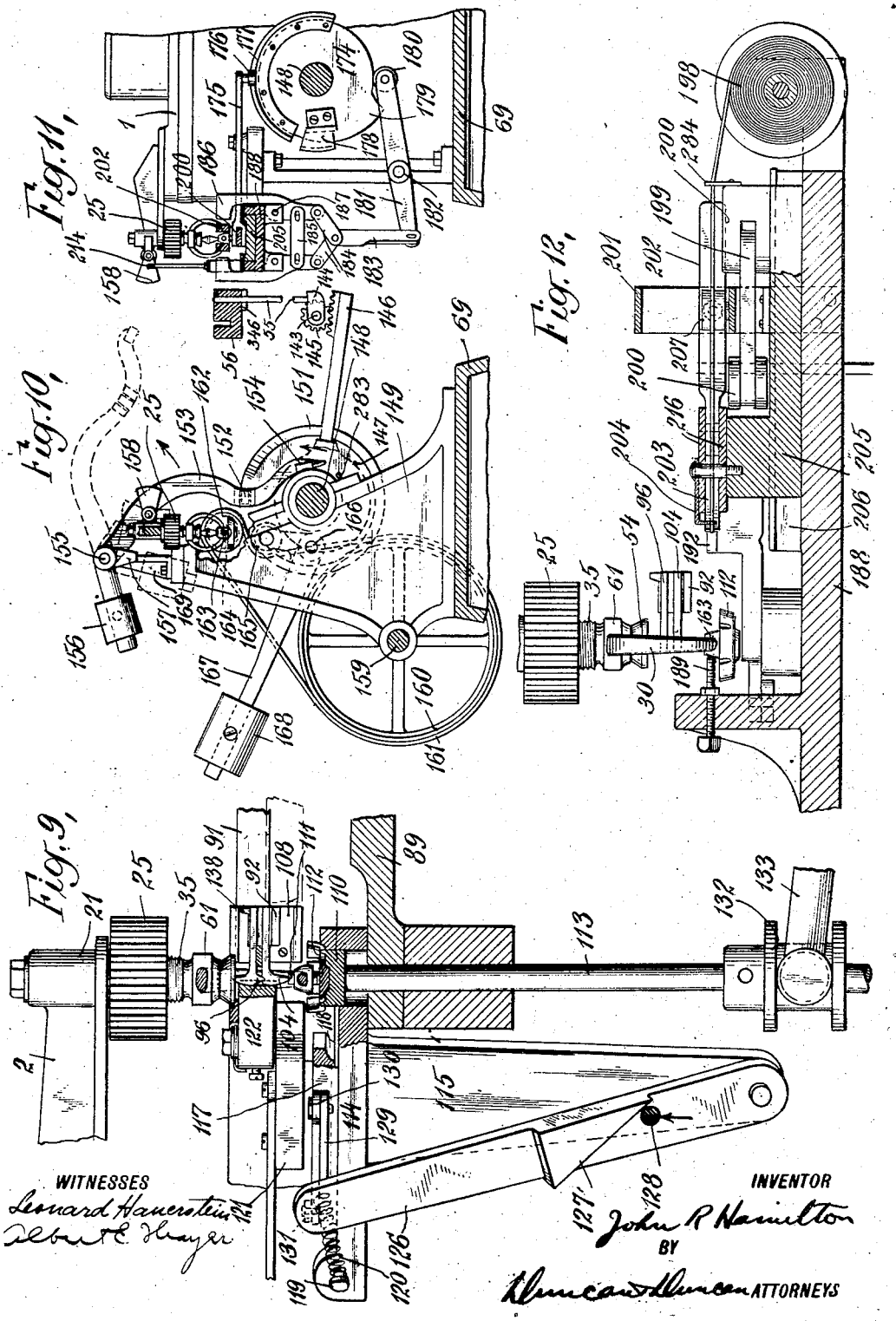

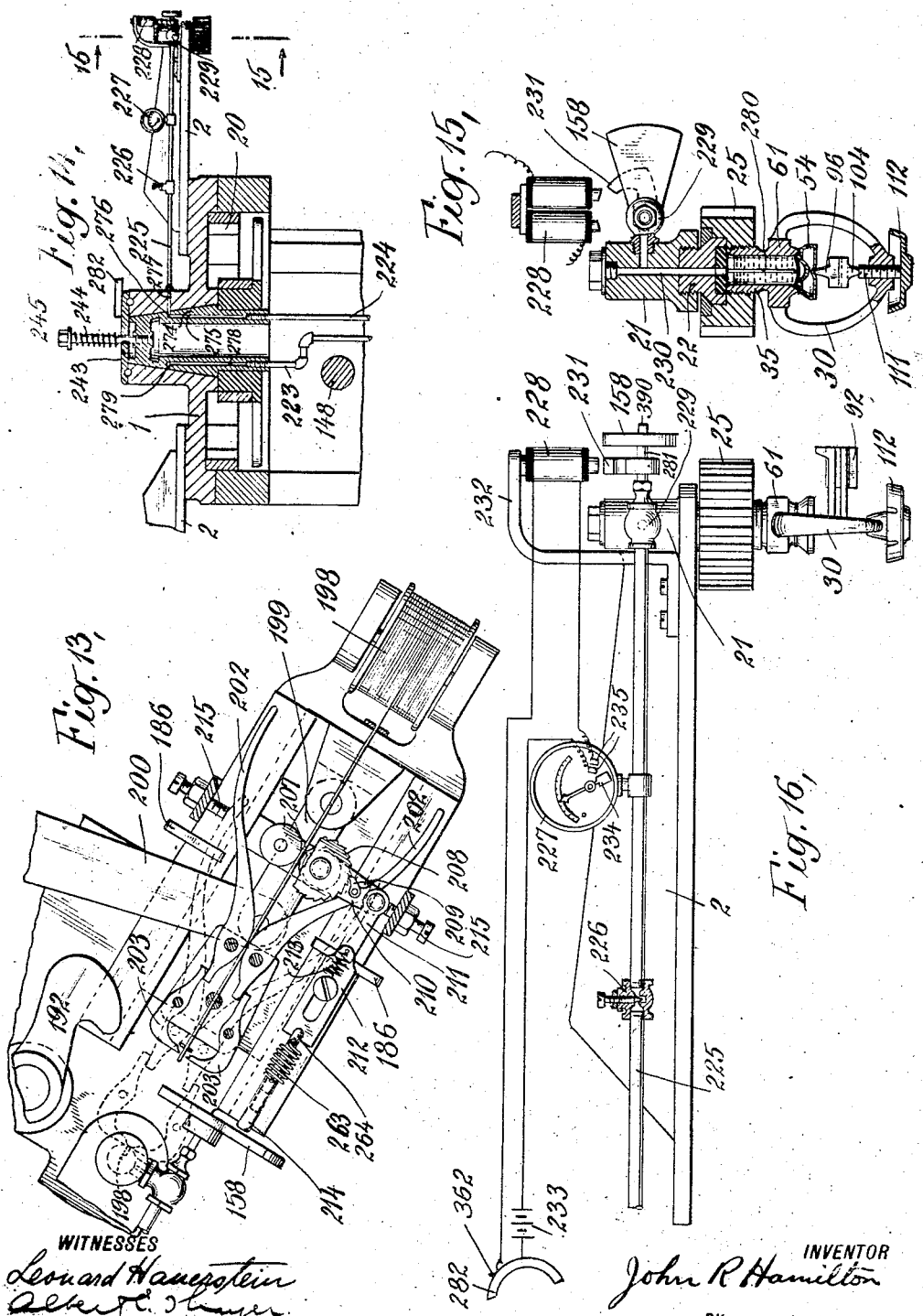

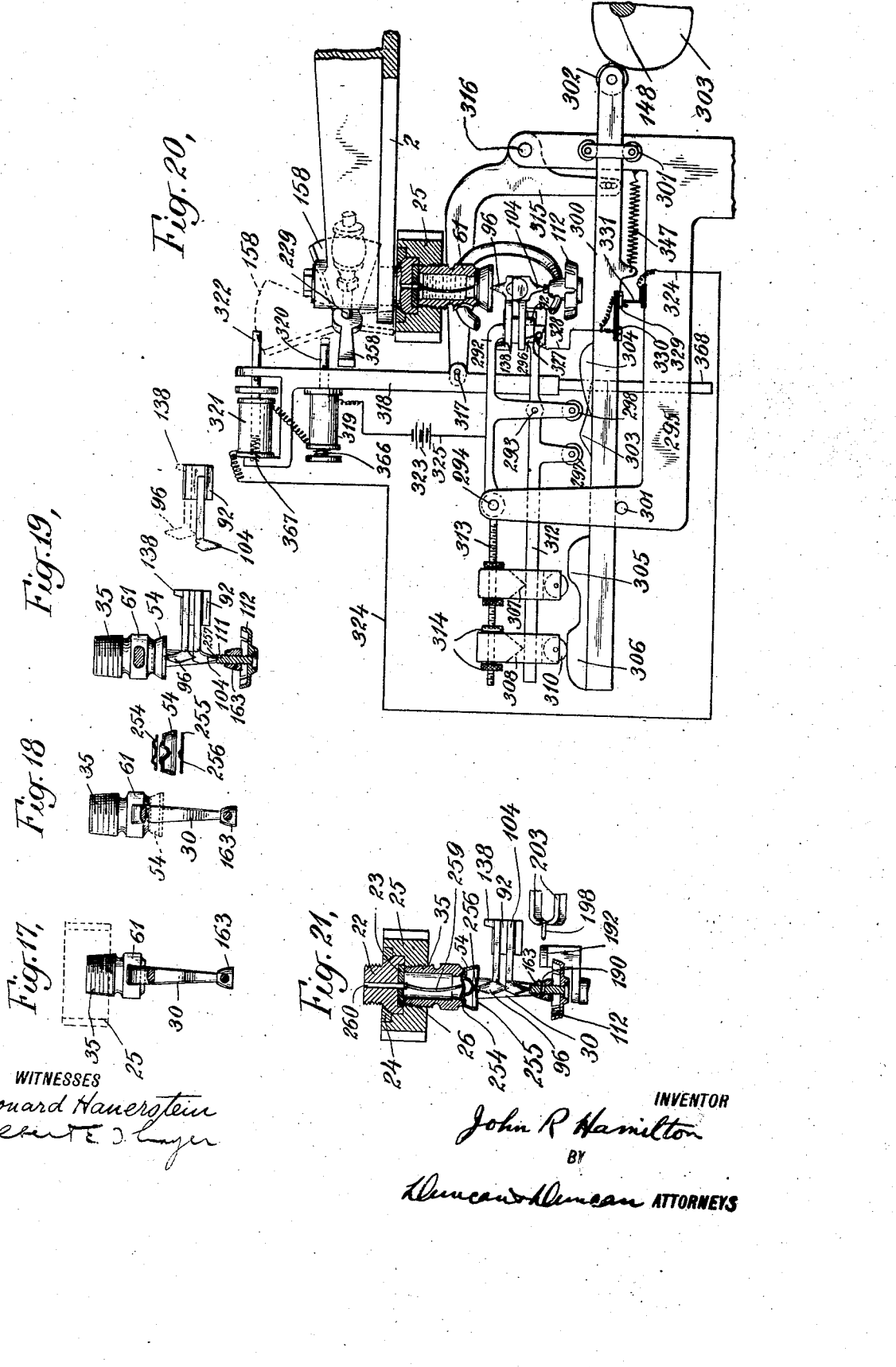

UNITED STATES PATENT OFFICE.

JOHN R. HAMILTON, OF YONKERS, NEW YORK, ASSIGNOR TO AUTOMATIC SPRINKLER COMPANY OF AMERICA, OF NEW YORK, N. Y., A CORPORATION OF NEW YORK.

MACHINE FOR ASSEMBLING AUTOMATIC SPRINKLER-HEADS.

1,206,107.  Specification of Letters Patent.  Patented Nov. 28, 1916.

Application filed April 6, 1912, Serial No. 688,872. Renewed May 27, 1916. Serial No. 100,377.

*To all whom it may concern:*

Be it known that I, JOHN R. HAMILTON, a citizen of the United States, and resident of Yonkers, Westchester county, New York, have made certain new and useful Inventions Relating to Machines for Assembling Automatic Sprinkler-Heads, of which the following is a specification, taken in connection with the accompanying drawings, forming part of the same.

This invention relates to machines for assembling and testing automatic sprinkler heads especially such heads as are described in the Hamilton Patent 998,574 of July 18, 1911. The machine may comprise a suitable carrier of any desired construction which may have the form of an intermittently rotated turret having any suitable holding devices for the head frames. These head frames may be gripped by the holding devices at one station as shown in Figure 17 and then at a succeeding station the parts forming the cap or valve may be placed in proper position with respect to the frame shown in Fig. 18. At one or more subsequent stations to which the head frame is transferred by the carrier the parts of the thermally releasable retainer device may be assembled and inserted and the deflector and attached screw set down thereupon with the desired tension as indicated in connection with Fig. 19. The head may then at subsequent stations be subjected to hydraulic pressure as indicated in Fig. 20 so as to detect any leakage of the head and as indicated in that figure a suitable load testing device may act on the head to automatically determine whether the pressure of the retainer on the cap is normal. At subsequent stations the satisfactory heads may be drilled and pinned as indicated in Fig. 21 and subsequently discharged from the carrier, the rejected heads being simultaneously separated from the satisfactory ones.

In the accompanying drawings showing in a somewhat diagrammatic manner an illustrative embodiment of this invention, Figure 1 is a general plan view. Fig. 2 is a front elevation. Fig. 3 is an enlarged vertical side section of certain parts at the frame inserting station including a section of the frame feed. Fig. 4 is a similar section taken from the opposite side. Fig. 5 is a vertical section showing the cap setting station, and Fig. 6 is a corresponding plan view. Fig. 7 is a perspective view of the parts at the retainer and deflector setting station and of the retainer assembling devices. Fig. 8 is a similar perspective view with the parts in another position. Fig. 9 is a vertical section of the retainer setting station. Fig. 10 is an end elevation of the drilling device. Fig. 11 is an end elevation of the pinning device. Fig. 12 is a longitudinal section thereof. Fig. 13 is a plan of the same. Fig. 14 is a vertical section of the turret and valve mechanism used in connection with the hydraulic test devices. Fig. 15 is an enlarged vertical section of portions thereof taken along the line 15—15 of Fig. 14. Fig. 16 is an enlarged elevation of this arm and connected devices. Fig. 17 is a diagram showing the operation effected at the frame inserting station. Fig. 18 similarly shows the cap setting operation. Fig. 19 illustrates diagrammatically the retainer assembling and setting. Fig. 20 shows the load testing devices; and Fig. 21 is a diagram of the pinning operation.

In the illustrative embodiment of the invention shown in the drawings, a suitable rigid frame such as 69 may be used to support the various operating parts such as the turret or carrier 1 which as indicated in Figs. 1, 2 and 14 may be conveniently mounted to revolve about a vertical axis and be provided with any desired number of turret arms 2 which may be provided with holding devices of any desired description to hold the parts of the head during the assembling operation. The turret may be conveniently given an intermittent rotation or step-by-step movement by any desired mechanism, such for instance, as the feed ratchet 19 shown in Fig. 1 which may be pivoted to the collar 266 and be swung into coöperation with the internal ratchet teeth 268 by a suitable spring 267. This ratchet may be oscillated at the desired intervals by any suitable mechanism such as the link 18 connected to the lever 17 whose cam roll is actuated by suitable cams such as 332, 333 on the cam cylinder 11 mounted upon the main shaft 148. This shaft as shown in Figs. 1 and 2 may be mounted in suitable bearings 8, 149 and be driven by the gears 9, 10 from the drive shaft carrying a suitable driving device such as the pulley 3. It is desirable to insure the definite alinement of the turret so that the turret arms will bring the head into definite alinement with the assembling devices at the various stations and for this purpose a suitable alining device or justifier 270 may as indicated in Fig. 1 be mounted to coöperate with a series of alining slots 269 in the sides of the turret so that when the cam roll 271 on this justifier is operated by the cams 287, 288 on the cam cylinder the justifier is forced into one of these alining apertures so as to definitely bring the turret into alinement and hold it in that position until the justifier is withdrawn and the turret moved forward another step to advance each of the turret arms to the next station.

As indicated in Fig. 3, the turret arms 2 may be formed at their outer ends with the chuck bosses 21 in which the chucks may be mounted by suitable screw necks 22 formed thereon, these chucks serving to revolubly support the chuck gears 25 which may be retained in position by the retaining rings 24 as indicated. These chuck gears are preferably provided with the threaded chuck throats 26 so formed that the threaded ends 35 of the head frames fit within these throats in order to insure a tight fit. A suitable packing 23 of copper or other material may be used within the chuck so as to prevent leakage.

The head frames 30 may be conveniently supplied to the machine by a frame belt such as 29, feeding a series of these frames through a chute so that the forward frame enters a suitable turner 37 and is longitudinally alined therein by engagement with the aliner 38. The succeeding frames may be disengaged from the frame in the turner by a suitable disengaging device or retractor 34 which may be swung about its pivot by a retractor pin or bar 31 which may be raised in the slot 32 at the proper time so as to engage the retractor arm 33 and swing the retractor sufficiently so as to positively disengage the coöperating threaded neck 35 from the head frame within the turner. The turner 37 which is a casing having an aperture adapted to admit the head frame which may have a square body 61, is pivoted by the pin 334 to the elevator 68 and also has in its extension 42 a turning pin 44 engaging the curved turning guide 41 in the guide plate 40, as shown in Figs. 3 and 4. In this way when the elevator rises the turner is carried upward and simultaneously swung about the pin 334 so as to turn the head frame into vertical position and carry its threaded end into engagement with the threaded chuck throat 26. It is also desirable to have a suitable clamp to hold the head frame in the turner during this action and for this purpose the turner clamp 261 may be provided and mounted on the clamp lever 260 pivoted about the pin 263 in the turner. This clamp is normally held up in active position so as to engage a head by a suitable light spring 262, although when the turner is in the lowered position shown in Fig. 3 the projecting end 264 of this clamp is brought into engagement with the releasing stop 36 so as to swing the gripping end of this clamp about its pivot into retracted position. The elevator 68 moves vertically in suitable guides, such as 64, in the frame as indicated in Fig. 2, and may be reciprocated at the proper time by a suitable link 66 pivoted to the pin 65 in the elevator and pivoted at its other end to a suitable elevator lever 67 swinging about the pin or shaft 70 in the frame and carrying a suitable counterweight 72 on the arm or extension 71 secured to this shaft. This shaft also carries the elevator cam arm 73 having the cam roll 74 adapted to be actuated by a suitable cam such as 75 on the cam drum 11. In this way the elevator is raised into the position indicated in full lines in Fig. 4 carrying the turner 37 upward into coöperation with the chuck gear 25, so that the threaded neck or connection of the head is inserted into the chuck throat 26. At the same time the inserting gear 27 is raised into mesh with the chuck gear 25 so as to rotate this gear and screw the head into the chuck throat so that it is brought into firm engagement with the packing 23. It is of course desirable to maintain the head in vertical position during this inserting operation and for this purpose a suitable centering spring such as 39 may be mounted on the elevator 68, as shown in Fig. 3, so that during this vertical movement a suitable pin on the end of this centering spring engages the threaded hole in the end of the head frame and maintains it in vertical position as well as yieldingly pressing it forward so that it is screwed into the chuck throat. The inserting gear 27 may as indicated be secured to the shaft 28 and extend through a friction clutch operating device 265. This clutch device may have the two adjustable clutch members 265 connected to a suitable sleeve mounted in the bracket 49 and connected to the skew gear 45. Between these adjustable clutch members is mounted a suitable friction disk 335 having a connected sleeve through which the shaft extends, a suitable spline or feather on the disk engaging the slot 336 in the shaft 28 so as to rotate the shaft in unison with the clutch disk, although when the desired torque is exceeded slip occurs between the disk and clutch members. The skew gear 45 meshes with a coöperating skew gear 46 on the shaft 337 and this shaft may have its pulley 6 driven by a suitable belt or sprocket chain 5 on the pulley 4 of the main shaft.

The caps may be inserted in the head frame at the second or any succeeding station and the cap inserting device is shown in Figs. 5 and 6. The cap members may be previously assembled manually or mechanically in any desired way and fed in a continuous row down the inclined cap guide or chute 52 so as to be alined by engagement with a spring detent 58 pivoted about the bolt 62 and normally held in the position indicated in Fig. 6 by a suitable spring 60. The first of these caps 54 is held in position out of line with the advancing head frames by a suitable lifting rod 55 provided at its upper end with a suitable projection to engage the recess in the cap and hold the same firmly in position in connection with a suitable cover, such as 53. When the turret brings one of the head frames into alinement with this cap setting station the lifting rod is lowered sufficiently to release the cap and the succeeding caps in the cap chute then push this first cap under the valve seat in the head frame and secure its positive alinement in connection therewith by contact with the spring detent 58. The lifting rod then rises first coming into alining and holding engagement with the succeeding cap and then rising sufficiently to bring its collar 346 into engagement with the guide track 56 to lift this guide track and the connected cap guide 52 away from the frame support 361 and to lift the cap on this track section into the valve seat in the head frame located at this station. This guide track is held in this elevated position so as to keep the cap in alinement with the head until the turret moves the head and cap to the next station where the cap is positively secured to the head. Then the lifting rod is lowered sufficiently to bring the track section into contact with the support 361, so as to allow another cap to be forced into alinement with the succeeding head frame. The lifting rod may be actuated by any desired mechanism such as by a rock arm on the stub shaft 143 shown in Figs. 2 and 10 and this stub shaft may be given an intermittent partial oscillation as by a gear 145 on this shaft meshing with the rack 146 on the end of an eccentric strap 147 which is actuated by a suitable eccentric on the main shaft 148.

The retainer assembling devices shown in Figs. 7 and 8 assemble the male and female strut or retainer members 96, 104, as shown in Fig. 19 so that they are connected by the fusible link 92 for insertion in the head so as to hold the cap in position on the valve seat thereof in connection with the holding screw 111 and deflector 112. The female retainers 104 are fed in a continuous row down the shaped retainer guide 9 and the male retainer members are similarly fed down the guide 80. A vertical row of the fusible links 92 is simultaneously fed down the link guide 81, all of these guides being supported in any desired way from the machine frame.

The pusher 91 for assembling the retainer is secured to the member 82 and is reciprocated at the desired times by the link 87 pivoted to the pusher lever 88 pivoted about the pin 16 in a suitable bracket on the frame and carrying at its outer end the roll 15 adapted to be engaged by suitable cams on the cam cylinder 11, such as cams 12 and 13. This pusher is so shaped as to come behind one of the links 92 and force the same forward into the slot in one of the male retainer members 96 which is held in alinement therewith by resting upon the shelf 101 formed on the block 85 in line with the lower edge of the retainer guide 102 and by a suitable grip, such as 106, which may be pivoted about the pin 107 in the block 85 and also if desired by the detainer 97 which may be pivoted in the bracket 99 on the link guide and normally held in the position indicated by the light spring 98. This link 92 as it is forced forward engages the curved depressor 100 so as to be downwardly deflected after its upper edge has passed the studs 138 in this retainer, the link then dropping down in the retainer slot so as to rest upon this male retainer member. At this time the tripping bar 86 connected to the member 82 and guided by the pin 93 in the support 94 on the block 85 engages the end of the retainer and rotates its holding end laterally out of engagement with the retainer 96. The link and male retainer member are then pushed forward together by the pusher, the block 85 moving forward in unison therewith since the member 82 has come into engagement with the collar 83 on the block rod 84.

The female retainer member 104 which has issued from the retainer guide 79 is held against forward movement by the spring holder 105 and is also engaged by the holding spring 103 which rests on top of this member near the guide so as to leave the slot 137 therein free. The link depending from the male retainer member is thus guided accurately into the slot 137 and the retainer members are in this way pushed together into coöperation so as to assume the relative positions indicated in full lines in Figs. 8 and 19. The pusher then comes into engagement with the alined rear ends of the link and retainer members and forces the spring holder 105 down so that the retainer members enter the alining guides 109 in the guide member 108. In this way they are accurately brought into alinement with the seat in the valve cap and are gradually brought to a stop by the end 124 in the spring pressed alining stop 122 pivoted about the pin 123 and spring pressed forward so as to absorb the forward movement of the retainer and bring it acurately into alinement in that direction as the alining stop engages the pin 272. At the same time the deflectors 112 are fed down the track 116 having a suitable inclination or feeding belt so that the screw 111 of the first deflector engages the screw notch 118 in a suitable shuttle 117 shown in Fig. 8. This shuttle is mounted on a suitable guideway which may be formed by the separated projections 142 on the plate 114, as shown in Fig. 7 and is normally retracted by the spring 120. This shuttle is moved forward at the proper time by the link 129 pivoted about the pin 130 connected to this shuttle. As shown in Fig. 9 the shuttle lever 126 is pivotally mounted on the bracket 115 and is pivoted at its upper end to this link 129 by the pin 131 so that when the pin 128 on the cam cylinder engages the inclined cam surface 127 on this shuttle lever it is moved forward sufficiently to bring the deflector screw into alinement with the socket 125 so as to be engaged by a tension chuck 110 on the tension shaft 113 (see Figs. 7 and 8); this feeding of the deflector taking place before the turret has brought the corresponding head frame into alinement with this station. As shown in Fig. 2 this tension shaft coöperates at its polygonal or feathered lower end with a suitable tension chuck having the member 338 connected through a suitable sleeve with the skew gear 341. This chuck member and the companion chuck member 339 are held together by adjustable springs 340 so as to press upon the clutch plate 342 of fiber or other light material which is splined to the tension shaft 113 so as to turn it in unison with the skew gear 143 while allowing slip if the normal torque is exceeded. The skew gear 341 may be driven in any desired way as by meshing with the skew gear 342 on the shaft 337. The tension shaft 113 may be raised by any suitable device, such as the lifter lever 133 having an end engaging the annular slot 132 in the sleeve secured to this tension shaft, the lifter lever being pivoted about the pin 134 as shown in Fig. 2 and having its upper arm 135 provided with a suitable cam roll 136 adapted to engage the cam 14 on the cam cylinder. In this way when the threaded aperture in the head is brought into alinement with the holding screw 111 the connected deflector 112 is engaged by the tension chuck 110 and the screw set home upon the alined retainer members 104, 96 so as to force the latter into the depression in the cap member and force the cap or valve tightly down on the valve seat in the head. The accurate adjustment of the turning moment or torque on this tension shaft insures the uniformity of the strain or load put upon these parts so that it is possible to hold the valve securely in position without danger of developing such stresses as might strain or permanently set the parts and destroy resiliency of their emergency releasing action.

If desired it is possible to test the loading of each head or the force with which its cap or valve is held in place by the retainer members and this may be conveniently done at any station after the parts have been assembled either before or after the heads have been hydraulically tested in case that is done. A load testing device for this purpose is indicated in Figs. 1 and 20 and this testing device may comprise a suitable gripping arm 292 to engage the upper retainer or the link above the same and this arm may if desired be pivoted about the pin 294 to a suitable bracket 295 mounted on the frame. Another coöperating gripping arm 296 having its face adapted to engage the retainer outside of the centrally located link 92 so that when these two gripping arms are forced together the retainer levers will be swung together against the strain normally put upon the parts. The gripping arm 296 may be pivoted by the pin 293 to the coöperating gripping arm and may have a suitable extension or scale beam 312 with which suitable weights 307, 308 may coöperate, the position of these weights being adjustable as by regulating the position of suitable set nuts 314 on the light spacing bar 313 passing loosely through the upper portion of these weights. When the turret carries a head into alinement with this load testing device the gripping arms are held in separated inoperative position by any suitable mechanism, such, for instance as the operating bar 300 which may be guided by suitable rolls 301 in supports connected to the frame of the machine and which may have suitable wedges or releasing devices 303, 304, 305 and 306 to disengage the parts. The wedge or cam member 303 coöperates with a suitable roll or member 297 on the gripping arm 296 so as to positively swing this arm about its pivot 293 to disengage it from the retainer and the similarly spaced disengaging cam 304 on this operating bar coöperates with the roll 298 pivoted in a downward extension on the gripping arm 292 so as to simultaneously raise this arm out of engagement. The similar disengaging cam 305 may as indicated coöperate with the minimum weight 307 so as to normally hold this out of engagement with the scale beam extension of the gripping arm 296 with which it loosely engages.

When one of the heads has been brought by the turret into alinement with this load testing device the rotation of the cam 303 on the main shaft 148 allows the heavy spring 347 connected to the operating bar 300 to draw this bar forward as far as is permitted by the roll 302 in engagement with the cam 303 on the main shaft 148. This forward movement of the operating bar withdraws the wedges or cams 303, 304 from the coöperating rolls so as to allow the gripping arms to engage the retainer members as stated and simultaneously the minimum weight 307, which may of course be of considerably greater size than indicated diagrammatically in the drawing, is allowed to descend upon the scale beam, the parts then taking the position shown in Fig. 20 and forcing the gripping arms together with a force equal to the minimum weight or minimum loading for which the head is designed. If the head is assembled with such weak tension as to allow the parts to yield under this minimum load the insulated pin 327 in the gripping arm 296 which is normally slightly out of contact therewith comes into electrical contact with the depending fin or flange of the fusible link 92 so as to complete the electrical circuit from the battery 323 connected through the wire 325 to the gripping arm 22 so as to energize the fusible link. The wire 328 connects the insulated pin 327 with the minimum bar contact 329 and also with the maximum bar contact 330 which are carried by the operating bar 300 but insulated therefrom by suitable interposed rubber or other insulation. The narrow minimum bar contact 329 is under these minimum loading conditions in electrical contact with the spring 331 carried by the bracket 295 but insulated therefrom, this contact spring being connected by the wire 324 with the maximum solenoid or magnet 321 and the minimum solenoid or magnet 319 which are thus connected in series with the battery or other suitable source of electricity 323. Under these circumstances the yielding of the retainer levers under this minimum loading so as to make contact between the insulated pin 327 and the retainer link 92 sends the current through both the maximum and minimum solenoids actuating their armatures and moving the minimum solenoid armature 320 against its spring 366 so as to project this armature into the path of the extension 358 of the trip 158 which may be mounted on any part of the turret arm 2 as for instance upon the stem of the cut-out valve 229 connected to this head, see Figs. 15 and 16.

The continued movement of the operating bar to the right under the influence of the spring 347, simultaneously moves the actuating lever 315 connected to the bar and pivoted about the pin 316 in a bracket on the frame member so that the other end of this actuating lever through the pin 317 moves the bar or support 318 vertically, carrying the projected armature 320 downward into contact with the trip extension 358 so as to swing the trip into vertical or rejection position, as indicated in dotted lines, thus visually indicating or determining the rejection of the head. In case, however, the head is strong enough to withstand this minimum loading the operating bar moves still farther forward until the cam 306 moves out from under the roll 310 on the excess or maximum weight 308 so as to allow this weight to also come into contact with the scale beam 312 connected to the gripping arm. This forces the gripping arms together more strongly so that the desired maximum loading is placed upon the head under which the retainer levers should yield and swing together if the head has been properly assembled. In case such yielding takes place at this time the insulated pin 327 comes into contact with the fusible link 92 so as to complete the electrical circuit through the battery 323 and the solenoids 319 and 321, the operating bar having carried the maximum bar contact 330 into contact with the spring 331 at this time. The battery 323 thus retracts the armature 322 out of the path of the trip 158. The continued vertical movement of the bar or support 318, which may be guided by having its reduced polygonal end 368 mounted in a guiding aperture in the bracket 295, therefore has no action on the trip which is allowed to remain in its normal position under these circumstances. If, however, the parts of the head are so stiff that they do not yield under this standard excess loading there is no contact between the insulated pin 327 and the link under these conditions and the solenoid armature 322 is not retracted, but is held out by its spring 367 so that when the connected bar or support 318 is moved vertically by the actuating lever, the trip is engaged and swung into its horizontal rejection position. The assembled heads may also be tested by submitting them to hydraulic pressure of 300 pounds more or less which may be conveniently applied through suitable ports in the turret mounting. As shown in Fig. 14 the turret may have a conical central bore with which a conical valve plug 274 may coöperate, the parts being preferably held together as by a top plate 243 which may be provided with ball bearings if desired and held in position by a suitable heavy spring 244 on a central bolt 245 engaging the valve plug. This valve plug may be formed with a pressure passage 275 communicating with the hydraulic supply pipe 224 and with a pressure port 276 which may extend a considerable distance around the circumference so that if desired the heads may be tested under this hydraulic pressure throughout about one-half the stations around the turret. It is also desirable to exhaust the water used in this hydraulic test and for that purpose the valve plug may be provided with a suction passage 278 communicating with a suction port 279 which may extend throughout a quarter of a circumference more or less so as to exhaust the water from the heads at the corresponding stations and discharge this water through a suitable suction pipe 223.

As indicated more in detail in Figs. 15 and 16, the turret may be provided with the test pipes 225 extending along each of the arms 2 so as to communicate with the passages 230 in each of the chuck bosses 21. It is also desirable to have a fine tube preferably having a resilient bent end 280 extending into the head substantially into contact with the cap member so as to deliver the testing fluid thereto and substantially completely exhaust it therefrom. Each of these testing pipes is preferably provided with an adjustable needle valve 226 so as to have an extremely fine discharge aperture therethrough and thus determine the presence of a leak in the head in case of unusual loss of pressure. For this purpose a suitable pressure gage 227 may be mounted in the testing pipe or connections at any point beyond the reducing valve 226 and this pressure gage may have its needle provided with an electric contact piece 234 adapted to close the electric contacts 235 in case of undesirable pressure reduction. In case of leak it is of course desirable to shut off the admission of testing fluid to the leaking head and a cut-off valve such as 229 may be used for this purpose the valve stem 281 preferably having thereon a suitable signal or trip such as 158, which may be manually operated if desired, or which may be automatically operated in any desired way by the leaking head. For this purpose the valve stem may be provided with a suitable armature 231 coöperating with the leak magnet 228 on the bracket 232 connected in circuit with the contacts 235 and with a suitable battery or source of electricity 233 connected to the machine frame so as to electrify the contact segment 282 held stationary on the top plate 243 and engaged by contact springs such as 362 on each of the arms 2; so that when the contacts 235 are closed this magnet will be energized sufficiently to attract the armature 231 and correspondingly rotate the valve stem 281 through a quarter revolution so as to close this cut-off valve and swing the trip 158 into substantially vertical position.

At any time after the heads have been assembled they may be permanently secured or locked in adjusted position in any way as by fixing the holding screw permanently in position in the head in any desired way, as for instance, by drilling and pinning the parts together. In Fig. 1 the drill 164 is shown in position to coöperate with the boss of the head into which the holding screw is threaded. This drill may as indicated in Fig. 10 be mounted on the shaft 163 rapidly rotated by a belt such as 161 passing over the pulley 162 and over the drive pulley 160 on the shaft 159 and over the tightening pulley 165 on the tightening lever 167 pivoted about the pin 166 and carrying the adjustable weight 168 at its free end. This countershaft 159 may as indicated in Fig. 2 be driven by the gear 169 meshing with the gear 7 which is on the main drive shaft of the machine; see Fig. 1. This drill is longitudinally movable and is forced forward into operative position by the cam roll 152 on the cut-out lever 153 pivoted about the pin 155 and having the adjustable counterweight 156. When in normal position this roll 152 coöperates with the cam 151 on the shaft 148 so that this lever and the connected drill bracket 150 are forced forward against the pressure of the springs, such as 171, and the drill is forced into the head boss and holding screw to the desired extent. This cut-out lever and its connected pin are normally drawn backward by the light spring 356 shown in Fig. 2 as connected to the bracket 170 and the free end of this lever is bent slightly so as to be engaged by the disengaging pin 283 on the cam 151 during its rotation as indicated in Fig. 10 so as to raise this cut-out lever slightly before the drill is fed forward. This slight movement occurs at about the time that the turret moves the head into position and in case the trip 158 has been moved into the vertical rejection position indicated in dotted lines in Fig. 10, this trip thereupon moves under the cut-out arm 157 on the pin 155 so that under these conditions the cut-out lever is carried upward into the inoperative dotted position shown in Fig. 10, the cam roll 152 being thus moved entirely out of coöperation with the cam 151 so that the rejected head is not drilled.

The pinning device as shown in Figs. 11, 12 and 13 may be conveniently located at a succeeding station and may comprise a pinning slide 205 mounted to reciprocate in the guideways 206 upon the support 188. It is desirable to firmly support the head during this pinning operation and for this purpose a suitable adjustable abutment may be arranged behind the boss in which the holding screw is pinned, this abutment being formed by a suitable adjusting screw 189 mounted in the support and firmly held in position as by a lock nut as indicated so that when the turret carries the head around into the pinning position the adjusting screw engages the boss 163 of the head. The pinning slide may be conveniently reciprocated by the pinning lever 200 connected by the pivoted link 199 with the slide and actuated by the cam roll 176 on the extension 175 of this lever which coöperates with the cam 177 and return cam 178 on the cam disk 174 on the cam shaft so as to reciprocate the pinning slide at the proper time. The wire or pin material may be in the form of a continuous pin roll 198 rotatably mounted on the pinning slide or support, the end being carried through the guide 284 adjacent the end of the slide and through the pin guide 204 at its front end. The pin is fed forward by a suitable intermittent feed device comprising the coöperating feed rolls 207 shown in Figs. 12 and 13, one of these rolls having a ratchet wheel 208 secured thereto as to be intermittently fed around to the desired extent by the pawl 209 mounted on a suitable arm 210 pivoted about the roll and actuated when the trips are in normal position. This may be effected by providing a suitable feed pin or finger 214 secured to the slide 212 and normally drawn forward by the spiral spring 213 so as to have its upper end in the path of the trip 158 unless the trip has been moved into the rejection position. Under normal conditions the feed pin strikes the trip as it moves forward, forcing the slide 213 and link 211 backward so as to feed forward the pin to the desired extent. Further movement of the pinning slide carries the ends of the operating levers 202 between the gripping pins 215 so as to force the gripping jaws 203 together sufficiently to securely clamp the pin between them and guide it as it is forced forward into the drill aperture in the boss and screw of the head. At this time the feed pin or finger 214 may telescope so as to obviate excessive pressure on the trip, as shown in Fig. 13 the hollow end of this finger sliding over the reduced extension 264 to the extent necessary, these parts being normally held apart by the spiral spring 263 connected thereto. At this time when the parts are in the dotted positions shown in Fig. 13, the gripping or cutting levers 186 are actuated so as to force the gripping jaws together still farther and sever the inserted pin from the remaining pin material. These gripping levers may be pivoted about the pins 187 and have their lower ends which are loosely connected by the slotted link 185 joined by the connecting or cutting links 184 which connect them to the cutting bar 183 pivoted to the end of the cutting lever 181, swinging about the pin 182. The roll 180 on the other end of this cutting lever coöperates with a suitable cam 179 on the shaft 148 so as to give this quick actuating movement described.

When the cutting slide and gripping jaws have been retracted the heading hammer 192 may be brought forcibly against the end of the inserted pin driving it in fully and riveting the adjacent material of the boss down upon it so as to permanently secure the parts in position. This heading hammer 192 may be pivoted about the pin 357 as shown in Fig. 1 and have its end pivoted to the link 194 which may be engaged by the heavy actuating spring 193. This link may be pivoted to the rock arm 197 and be provided with the cam projection 195 actuated by the coöperating cam recess 196 on the cam 174 so as to instantly release the heading hammer and allow the actuating spring to forcibly swing the hammer against the pin and boss and rivet them together as indicated.

When the turret brings the heads into alinement at the discharge station they may be conveniently discharged or released from the chuck throats by a suitable discharge gear 51 on the shaft 50 which may if desired be operated through a suitable friction clutch 359 similar to the one described in connection with the inserter gear and operated by the skew gears 47, 48 from the shaft 337. When the elevator 68 rises it may also carry this discharge gear 51 up into mesh with the chuck gear 25 so as to rotate the same in such direction as to disengage from the chuck throat the head which is held against rotation in any desired way as by having its arms engage a coöperating part of the elevator. A suitable sorting finger, such as 219, may be mounted on the elevator so as to be carried with it into engagement with the projection or extension 358 on the end of the trip 158 when this trip is in vertical rejection position. This sorting finger may be mounted on the lever 360 pivoted about the pin 361 in the elevator and also pivoted to the link 218 which may be provided at its lower end with the slot 288 with which the pin 287 in the rock arm 221 coöperates. This rock arm may operate a suitable rejection door 285 pivoted about the pin 286 to which the rock arm 221 is connected so that when this sorting finger is actuated by the rejection position of the trip the rejection door 285 in the slide 217 is raised and the head when released from the chuck throat drops through this rejection door so as not to pass down the slide as in the case of the satisfactory or approved heads. The trips may be reset or moved into normal position by any suitable device which may be located adjacent the retainer feeding device as shown in Fig. 2, and which may for instance comprise the cam shaped resetter 360 which may engage the resetting pins on projections 390 on the arms 358 of the trips to restore each trip passing this station to its normal horizontal position indicated in full lines.

Having described this invention in connection with a number of illustrative embodiments, forms, proportions, materials, devices, arrangements and orders of steps, to the details of which disclosure the invention is not of course to be secured by Letters Patent is set forth in the appended claims.

I claim—

1. In machines for assembling automatic sprinkler heads or the like, a rotary turret carrier provided with arms having holding devices to engage head frames, a valve plug mounted axially of said carrier and provided with pressure and suction passages and ports, testing pipes connected with said holding devices and adapted to coöperate with said ports, cut-off valves in said testing pipes and connected trips coöperating with said holding devices, means to intermittently move said carrier to bring the head frames into coöperation with various stations, feeding and inserting devices to bring head frames into coöperation with the holding devices in said carrier, means to feed caps into coöperation with said head frames, retainer setting devices to feed retainers into coöperation with said head frames at one of said stations, means to insert holding screws into said head frames at one of said stations, a tension shaft and connected slip friction clutch driving gear to screw home said holding screws with a substantially uniform torque and place said caps and retainers under substantially uniform load, load testing devices to engage and test the assembled heads at one of said stations and to automatically set the coöperating trips in rejection position in case of the unsatisfactory condition of any of said heads, pressure testing apparatus comprising a reduction valve and a pressure gage in each of said testing pipes and coöperating automatic trip, actuating means to test said heads throughout a number of said stations and set said trips in rejection position in case undesirable leakage occurs in the corresponding heads, locking devices coöperating with said carrier and having their operation controlled by said trips, disengaging means to disengage said heads from said carrier and sorting devices controlled by said trips to separate the heads when the corresponding trips are in rejection position.

2. In machines for assembling automatic sprinkler heads or the like, a rotary turret carrier provided with arms having holding devices to engage said frames, a valve plug mounted axially of said carrier and provided with pressue passages and ports, testing pipes connected with said holding devices and adapted to coöperate with said ports, trips coöperating with said holding devices, means to intermittently move said carrier to bring the head frames into coöperation with various stations, feeding and inserting devices to bring head frames into coöperation with the holding devices in said carrier, means to feed caps into coöperation with said head frames, retainer setting devices to feed retainers into coöperation with said head frames at one of said stations, means to insert holding screws into said head frames at one of said stations, a tension shaft and connected slip driving gear to screw home said holding screws with a substantially uniform torque and place said caps and retainers under substantially uniform load, load testing devices to engage and test the assembled heads at one of said stations and to automatically set the coöperating trips in rejection position in case of the unsatisfactory condition of any of said heads, pressure testing apparatus comprising a reduction valve and a pressure gage in each of said testing pipes and coöperating automatic trip actuating means to test said heads throughout a number of said stations and set said trips in rejection position in case undesirable leakage occurs in the corresponding heads, locking devices coöperating with said carrier and having their operation controlled by said trips, disengaging means to disengage said heads from said carrier and sorting devices controlled by said trips to separate the heads when the corresponding trips are in rejection position.

3. In machines for assembling automatic sprinkler heads or the like, a rotary turret carrier provided with arms having holding devices to engage head frames, trips coöperating with said holding devices, means to intermittently move said carrier to bring the head frames into coöperation with various stations, feeding and inserting devices to bring head frames into coöperation with the holding devices in said carrier, means to feed caps into coöperation with said head frames, retainer setting devices to feed retainers into coöperation with said head frames at one of said stations, means to insert holding screws into said head frames at one of said stations, a tension shaft and connected slip driving gear to screw home said holding screws with a substantially uniform torque and place said caps and retainers under substantially uniform load, testing devices to engage and test the assembled heads and to automatically set the coöperating trips in rejection position in case of the unsatisfactory condition of any of said heads, locking devices coöperating with said carrier and having their operation controlled by said trips, disengaging means to disengage said heads from said carrier and sorting devices controlled by said trips to separate the heads when the corresponding trips are in rejected position.

4. In machines for assembling automatic sprinkler heads or the like, a rotary carrier having holding devices to engage head frames, a valve plug mounted axially of said carrier and provided with pressure and suction passages and ports, testing pipes connected with said holding devices and adapted to coöperate with said ports, cut-off valves in said testing pipes and connected trips coöperating with said holding devices, means to intermittently move said carrier to bring the head frames into coöperation with various stations, feeding and inserting devices to bring head frames into coöperation with the holding devices in said carrier, means to feed caps into coöperation with said head frames, retainer setting devices to feed retainers into coöperation with said head frames at one of said stations, means to insert holding screws into said head frames at one of said stations, a tension shaft and connected slip friction clutch driving gear to screw home said holding screws with a substantially uniform torque and place said caps and retainers under substantially uniform load, pressure testing apparatus comprising a reduction valve and a pressure gage in each of said testing pipes and coöperating automatic trip actuating means to test said heads throughout a number of said stations and set said trips in rejection position in case undesirable leakage occurs in the corresponding heads, locking devices coöperating with said carrier and having their operation controlled by said trips, disengaging means to disengage said heads from said carrier and sorting devices controlled by said trips to separate the heads when the corresponding trips are in rejection position.

5. In machines for assembling automatic sprinkler heads or the like, a rotary carrier having holding devices to engage head frames, a valve mounted axially of said carrier and provided with pressure passages and ports, testing pipes connected with said holding devices and adapted to coöperate with said ports, trips coöperating with said holding devices, means to intermittently move said carrier to bring the head frames into coöperation with various stations, feeding and inserting devices to bring head frames into coöperation with the holding devices in said carrier, means to feed caps into coöperation with said head frames, retainer setting devices to feed retainers into coöperation with said head frames at one of said stations, means to insert holding screws into said head frames at one of said stations, a tension shaft and connected slip driving gear to screw home said holding screws with a substantially uniform torque and place said caps and retainers under substantially uniform load, pressure testing apparatus comprising a reduction valve and a pressure gage in each of said testing pipes and coöperating automatic trip actuating means to test said heads throughout a number of said stations and set said trips in rejection position in case undesirable leakage occurs in the corresponding heads, locking devices coöperating with said carrier and having their operation controlled by said trips, disengaging means to disengage said heads from said carrier and sorting devices controlled by said trips to separate the heads when the corresponding trips are in rejection position.

6. In machines for assembling automatic sprinkler heads or the like, a rotary carrier having holding devices to engage head frames, a valve mounted axially of said carrier and provided with pressure passages and ports, testing pipes connected with said holding devices and adapted to coöperate with said ports, trips coöperating with said holding devices, means to intermittently move said carrier to bring the head frames into coöperation with various stations, feeding and inserting devices to bring head frames into coöperation with the holding devices in said carrier, means to feed caps into coöperation with said head frames, retainer setting devices to feed retainers into coöperation with said head frames at one of said stations, means to insert holding screws into said head frames at one of said stations, a tension shaft and connected slip driving gear to screw home said holding screws with a substantially uniform torque and place said caps and retainers under substantially uniform load, pressure testing apparatus comprising automatic trip actuating means to test said heads throughout a number of said stations and set said trips in rejection position in case undesirable leakage occurs in the corresponding heads, locking devices coöperating with said carrier and having their operation controlled by said trips, disengaging means to disengage said heads from said carrier and sorting devices controlled by said trips to separate the heads when the corresponding trips are in rejection position.

7. In machines for assembling automatic sprinkler heads or the like, a rotary carrier having holding devices to engage head frames, a valve mounted axially of said carrier and provided with pressure passages and ports, testing pipes connected with said holding devices and adapted to coöperate with said ports, trips coöperating with said holding devices, means to intermittently move said carrier to bring the head frames into coöperation with various stations, feeding and inserting devices to bring head frames into coöperation with the holding devices in said carrier, means to feed caps into coöperation with said head frames, retainer setting devices to feed retainers into coöperation with said head frames at one of said stations, means to place said caps and retainers under substantially uniform load, pressure testing apparatus comprising automatic trip actuating means to test said heads throughout a number of said stations and set said trips in rejection position in case undesirable leakage occurs in the corresponding heads, locking devices coöperating with said carrier and having their operation controlled by said trips, disengaging means to disengage said heads from said carrier and sorting devices controlled by said trips to separate the heads when the corresponding trips are in rejection position.

8. In machines for assembling automatic sprinkler heads or the like, a movable carrier having threaded holding devices to engage the threaded necks of head frames, trips coöperating with said holding devices, means to intermittently move said carrier to bring the head frames into coöperation with various stations, feeding and inserting devices to insert a head frame into each of said holding devices in said carrier, means to feed caps into coöperation with said head frames, retainer setting devices to feed retainers into coöperation with said head frames at one of said stations, means to insert holding screws into said head frames at one of said stations and a tension shaft and connected slip friction clutch driving gear to screw home said holding screws with a substantially uniform torque and place said caps and retainers under substantially uniform load, load testing devices to engage and test the assembled heads at one of said stations and automatically set the coöperating trips in rejection position in case of the unsatisfactory condition of said heads, pressure testing apparatus to test said heads at a number of said stations and automatically set said trips in case undesirable leakage occurs in the corresponding heads, head locking devices coöperating with said carrier and controlled by said trips, disengaging means to disengage said heads from said carrier and sorting devices controlled by said trips to separate the rejected heads.

9. In machines for assembling automatic sprinkler heads or the like, a movable carrier having holding devices to engage head frames, trips coöperating with said holding devices, means to intermittently move said carrier to bring the head frames into coöperation with various stations, feeding and inserting devices to insert a head frame into each of said holding devices in said carrier, means to feed caps into coöperation with said head frames, retainer setting devices to feed retainers into coöperation with said head frames at one of said stations, means to insert holding screws into said head frames at one of said stations and a tension shaft and connected slip driving gear to screw home said holding screws with a substantially uniform torque and place said caps and retainers under substantially uniform load, load testing devices to engage and test the assembled heads at one of said stations and automatically set the coöperating trips in rejection position in case of the unsatisfactory condition of said heads, pressure testing apparatus to test said heads at a number of said stations and automatically set said trips in case undesirable leakage occurs in the corresponding heads, head locking devices coöperating with said carrier and controlled by said trips, disengaging means to disengage said heads from said carrier and sorting devices controlled by said trips to separate the rejected heads.

10. In machines for assembling automatic sprinkler heads, or the like, a movable carrier having holding devices to engage head frames, trips coöperating with said holding devices, means to intermittently move said carrier to bring the head frames into coöperation with various stations, feeding and inserting devices to insert a head frame into each of said holding devices in said carrier, means to feed caps into coöperation with said head frames, retainer setting devices to feed retainers into coöperation with said head frames at one of said stations, means to insert holding screws into said head frames at one of said stations and a tension shaft and connected slip driving gear to screw home said holding screws with a substantially uniform torque and place said caps and retainers under substantially uniform load, testing devices to engage and test the assembled heads at one of said stations and automatically set the coöperating trips in rejection position in case of the unsatisfactory condition of said heads, head locking devices coöperating with said carrier and controlled by said trips, disengaging means to disengage said heads from said carrier and sorting devices controlled by said trips to separate the rejected heads.

11. In machines for assembling automatic sprinkler heads or the like, a movable carrier having holding devices to engage head frames, trips coöperating with said holding devices, means to intermittently move said carrier to bring the head frames into coöperation with various stations, feeding and inserting devices to insert a head frame into each of said holding devices in said carrier, means to feed caps into coöperation with said head frames, retainer setting devices to feed retainers into coöperation with said head frames at one of said stations, means to place said caps and retainers under substantially uniform load, testing devices to engage and test the assembled heads at one of said stations and automatically set the coöperating trips in rejection position in case of the unsatisfactory condition of said heads, head locking devices coöperating with said carrier and controlled by said trips, disengaging means to disengage said heads from said carrier and sorting devices controlled by said trips to separate the rejected heads.

12. In machines for assembling automatic sprinkler heads or the like, a movable carrier having threaded holding devices to engage the threaded necks of head frames, means to intermittently move said carrier to bring the head frames into coöperation with various stations, feeding and inserting devices to insert a head frame into each of said holding devices in said carrier, means to feed caps into coöperation with said head frames, retainer setting devices to feed retainers into coöperation with said head frames, at one of said stations, means to insert holding screws into said head frames at one of said stations and a tension shaft and connected slip friction clutch driving gear to screw home said holding screws with a substantially uniform torque and place said caps and retainers under substantially uniform load, load testing devices to engage and test the assembled heads at one of said stations and automatically indicate the unsatisfactory condition of said heads, pressure testing apparatus to test said heads at a number of said stations and automatically indicate undesirable leakage of said corresponding heads, head locking devices coöperating with said carrier and disengaging means to disengage said heads from said carrier.

13. In machines for assembling automatic sprinkler heads or the like, a movable carrier having holding devices to engage head frames, means to intermittently move said carrier to bring the head frames into coöperation with various stations, feeding and inserting devices to insert a head frame into each of said holding devices in said carrier, means to feed caps into coöperation with said head frames, retainer setting devices to feed retainers into coöperation with said head frames at one of said stations, means to insert holding screws into said head frames at one of said stations and a tension shaft and connected slip driving gear to screw home said holding screws with a substantially uniform torque and place said caps and retainers under substantially uniform load, load testing devices to engage and test the assembled heads at one of said stations and automatically indicate the unsatisfactory condition of said heads, pressure testing apparatus to test said heads at a number of said stations and automatically indicate undesirable leakage of said corresponding heads, head locking devices coöperating with said carrier and disengaging means to disengage said heads from said carrier.

14. In machines for assembling automatic sprinkler heads or the like, a movable carrier having holding devices to engage head frames, means to intermittently move said carrier to bring the head frames into coöperation with various stations, feeding and inserting devices to insert a head frame into each of said holding devices in said carrier, means to feed caps into coöperation with said head frames, retainer setting devices to feed retainers into coöperation with said head frames at one of said stations, means to insert holding screws into said head frames at one of said stations and a tension shaft and connected slip driving gear to screw home said holding screws with a substantially uniform torque and place said caps and retainers under substantially uniform load, testing devices to engage and test the assembled heads at one of said stations and automatically indicate the unsatisfactory condition of said heads, head locking devices coöperating with said carrier and disengaging means to disengage said heads from said carrier.

15. In machines for assembling automatic sprinkler heads or the like, a movable carrier having holding devices to engage head frames, means to intermittently move said carrier to bring the head frames into coöperation with various stations, feeding and inserting devices to insert a head frame into each of said holding devices in said carrier, means to feed caps into coöperation with said head frames, retainer setting devices to feed retainers into coöperation with said head frames at one of said stations, means to place said caps and retainers under substantially uniform load, testing devices to engage and test the assembled heads at one of said stations and automatically indicate the unsatisfactory condition of said heads, head locking devices coöperating with said carrier and disengaging means to disengage said heads from said carrier.

16. In machines for assembling automatic sprinkler heads or the like, a movable carrier having threaded holding devices to engage the threaded necks of head frames, means to intermittently move said carrier to bring the head frames into coöperation with various stations, feeding and inserting devices to insert a head frame into each of said holding devices in said carrier, means to feed caps into coöperation with said head frames, retainer setting devices to feed retainers into coöperation with said head frames at one of said stations, means to place said caps and retainers under substantially uniform load, testing devices to engage and test the assembled heads at one of said stations and automatically indicate the unsatisfactory condition of said heads, head locking devices coöperating with said carrier and disengaging means to disengage said heads from said carrier.

17. In machines for assembling automatic sprinkler heads, a movable carrier having holding devices to engage head frames, trips coöperating with said holding devices, means to intermittently move said carrier to bring the head frames into coöperation with various stations, feeding devices to bring head frames into coöperation with the holding devices in said carrier, means to feed caps into coöperation with said head frames, retainer feeding devices to feed retainers and holding means into coöperation with said head frames, head tensioning means to force home said holding means and place said caps and retainers under substantially uniform load, load testing devices to engage and test the assembled heads at one of said stations and automatically set the coöperating trips in rejection position in case of the unsatisfactory condition of said heads, hydraulic pressure testing apparatus to test said heads and automatically set said trips in case undesirable leakage occurs in the corresponding heads, locking devices coöperating with said carrier and controlled by said trips to lock the satisfactory heads in adjusted position, disengaging means to disengage said heads from said carrier and sorting devices controlled by said trips to separate the rejected heads.

18. In machines for assembling automatic sprinkler heads, a movable carrier having holding devices to engage head frames, trips coöperating with said holding devices, means to intermittently move said carrier to bring the head frames into coöperation with various stations, feeding devices to bring head frames into coöperation with the holding devices in said carrier, means to feed caps into coöperation with said head frames, retainer feeding devices to feed retainers and holding means into coöperation with said head frames, head tensioning means to force home said holding means and place said caps and retainers under substantially uniform load, testing devices to engage and test the assembled heads at one of said stations and automatically set the coöperating trips in rejection position in case of the unsatisfactory condition of said heads, locking devices coöperating with said carrier and controlled by said trips to lock the satisfactory heads in adjusted position, disengaging means to disengage said heads from said carrier and sorting devices controlled by said trips to separate the rejected heads.

19. In machines for assembling automatic sprinkler heads, a movable carrier having holding devices to engage said frames, trips coöperating with said holding devices, means to intermittently move said carrier to bring the head frames into coöperation with various stations, feeding devices to bring head frames into coöperation with the holding devices in said carrier, means to feed caps into coöperation with said head frames, retainer feeding devices to feed retainers and holding means into coöperation with said head frames, head tensioning means to force home said holding means and place said caps and retainers under substantially uniform load, testing devices to engage and test the assembled heads at one of said stations and automatically set the coöperating trips in rejection position in case of the unsatisfactory condition of said heads, locking devices coöperating with said carrier and controlled by said trips to lock the satisfactory heads in adjusted position, and disengaging means to disengage said heads from said carrier.

20. In machines for assembling automatic sprinkler heads, a carrier having holding devices to engage head frames means to move said carrier relatively to said feeding or assembling devices to bring the head frames into coöperation with the various stations, feeding devices to bring head frames into coöperation with the holding devices in said carrier, means to feed caps into coöperation with said head frames, retainer feeding devices to feed retainers and holding means into coöperation with said head frames, head tensioning means comprising a tension shaft and connected slip driving gear to force home said holding means and place said caps and retainers under substantially uniform load, load testing devices to engage and test the assembled heads at one of said stations and automatically indicate the unsatisfactory condition of said heads, hydraulic pressure testing apparatus to test said heads throughout a number of said stations and automatically indicate undesirable leakage of said heads, locking devices coöperating with said carrier to lock the satisfactory heads in adjusted position, and disengaging means to disengage said heads from said carrier.

21. In machines for assembling automatic sprinkler heads, a carrier having holding devices to engage head frames and relatively movable with respect to feeding or assembling devices at a series of stations, means to move said carrier relatively to said feeding or assembling devices to bring the head frames into coöperation with the various stations, feeding devices to bring head frames into coöperation with the holding devices in said carrier, means to feed caps into coöperation with said head frames, retainer feeding devices to feed retainers and holding means into coöperation with said head frames, head tensioning means to force home said holding means and place said caps and retainers under substantially uniform load, load testing devices to engage and test the assembled heads and automatically indicate the unsatisfactory condition of said heads, hydraulic pressure testing apparatus to test said heads throughout a number of said stations and automatically indicate undesirable leakage of said heads, locking devices coöperating with said carrier to lock the satisfactory heads in adjusted position, and disengaging means to disengage said heads from said carrier.

22. In machines for assembling automatic sprinkler heads, a carrier having holding devices to engage head frames and relatively movable with respect to feeding or assembling devices at a series of stations, means to move said carrier relatively to said feeding or assembling devices to bring the head frames into coöperation with the various stations, feeding devices to bring head frames into coöperation with the holding devices in said carrier, means to feed caps into coöperation with said head frames, retainer feeding devices to feed retainers and holding means into coöperation with said head frames, head tensioning means to force home said holding means and place said caps and retainers under substantially uniform load, testing devices to engage and test the assembled heads and automatically indicate the unsatisfactory condition of said heads, locking devices coöperating with said carrier to lock the satisfactory heads in adjusted position and disengaging means to disengage said heads from said carrier.

23. In machines for assembling automatic sprinkler heads or the like, a rotary turret carrier provided with arms having holding devices to engage head frames, trips coöperating with said holding devices, means to intermittently move said carrier to bring the head frames into coöperation with various stations, feeding and inserting devices to bring head frames into coöperation with the holding devices in said carrier, means to feed caps into coöperation with said head frames, retainer setting devices to feed retainers into coöperation with said head frames at one of said stations, means to insert holding screws into said head frames at one of said stations, a tension shaft and connected slip driving gear to screw home said holding screws with a substantially uniform torque and place said caps and retainers under substantially uniform load, testing devices to engage and test the assembled heads and to automatically set the coöperating trips in rejection position in case of the unsatisfactory condition of any of said heads and disengaging means to disengage said heads from said carrier and sorting devices controlled by said trips to separate the heads when the corresponding trips are in rejection position.

24. In machines for assembling automatic sprinkler heads or the like, a rotary carrier having holding devices to engage head frames, a valve mounted axially of said carrier and provided with pressure passages and ports, testing pipes connected with said holding devices and adapted to coöperate with said ports, trips coöperating with said holding devices, means to intermittently move said carrier to bring the head frames into coöperation with various stations, feeding and inserting devices to bring head frames into coöperation with the holding devices in said carrier, means to feed caps into coöperation with said head frames, retainer setting devices to feed retainers into coöperation with said head frames at one of said stations, means to place said caps and retainers under substantially uniform load, pressure testing apparatus comprising automatic trip actuating means to test said heads throughout a number of said stations and set said trips in rejection position in case undesirable leakage occurs in the corresponding heads, and sorting devices controlled by said trips to separate the heads when the corresponding trips are in rejection position.

25. In machines for assembling automatic sprinkler heads or the like, a movable carrier having holding devices to engage head frames, trips coöperating with said holding devices, means to intermittently move said carrier to bring the head frames into coöperation with various stations, feeding and inserting devices to insert a head frame into each of said holding devices in said carrier, means to feed caps into coöperation with said head frames, retainer setting devices to feed retainers into coöperation with said head frames at one of said stations, means to place said caps and retainers under substantially uniform load, testing devices to engage and test the assembled heads at one of said stations and automatically set the coöperating trips in rejection position in case of the unsatisfactory condition of said heads, disengaging means to disengage said heads from said carrier and sorting devices controlled by said trips to separate the rejected heads.

26. In machines for assembling automatic sprinkler heads or the like, a movable carrier having threaded holding devices to engage the threaded necks of head frames, means to intermittently move said carrier to bring the head frames into coöperation with various stations, feeding and inserting devices to insert a head frame into each of said holding devices in said carrier, means to feed caps in coöperation with said head frames, retainer setting devices to feed retainers into coöperation with said head frames at one of said stations, means to place said caps and retainers under substantially uniform load, testing devices to engage and test the assembled heads at one of said stations and automatically indicate the unsatisfactory condition of said heads, and disengaging means to disengage said heads from said carrier.

27. In machines for assembling automatic sprinkler heads, a movable carrier having holding devices to engage head frames, trips coöperating with said holding devices, means to intermittently move said carrier to bring the head frames into coöperation with various stations, feeding devices to bring head frames into coöperation with the holding devices in said carrier, means to feed caps into coöperation with said head frames, retainer feeding devices to feed retainers and holding means into coöperation with said head frames, head tensioning means to force home said holding means and place said caps and retainers under substantially uniform load, testing devices to engage and test the assembled heads at one of said stations and automatically set the coöperating trips in rejection position in case of the unsatisfactory condition of said heads and disengaging means to disengage said heads from said carrier.

28. In machines for assembling automatic sprinkler heads, a carrier having holding devices to engage head frames and relatively movable with respect to feeding or assembling devices at a series of stations, means to move said carrier relatively to said feeding or assembling device to bring the head frames into coöperation with the various stations, feeding devices to bring head frames into coöperation with the holding devices in said carrier, means to feed caps into coöperation with said head frames, retainer feeding devices to feed retainers and holding means into coöperation with said head frames, head tensioning means to force home said holding means and place said caps and retainers under substantially uniform load and testing devices to engage and test the assembled heads and automatically indicate the unsatisfactory condition of said heads.

29. In machines for assembling automatic sprinkler heads, a movable support comprising a holding device to engage head frames, feeding means to bring a head frame into coöperation with said holding device, means to feed caps, retainers and holding means into coöperation with said frame and to assemble the same into a sprinkler head and load testing and leak testing devices to engage and test said assembled head and automatically indicate its unsatisfactory condition.

30. In machines for assembling automatic sprinkler heads, a support comprising a holding device to engage head frames, feeding means to bring a head frame into coöperation with said holding device, means to feed caps, retainers and holding means into coöperation with said frame and to assemble the same into a sprinkler head and load testing devices to engage and test said assembled head and automatically indicate its unsatisfactory condition.

31. In machines for assembling automatic sprinkler heads, a support comprising a holding device to engage head frames, feeding means to bring a head frame into coöperation with said holding device, means to feed additional parts into coöperation with said frame and to assemble the same into a sprinkler head and testing devices to engage and test said assembled heads and automatically indicate its unsatisfactory condition.

32. In machines for assembling automatic sprinkler heads, a support comprising a holding device to engage head frames, feeding means to bring a head frame into coöperation with said holding device, means to feed caps, retainers and holding means into coöperation with said frame and to assemble the same into a sprinkler head and load testing and leak testing devices to engage and test said assembled head.

33. In machines for assembling automatic sprinkler heads, a support comprising a holding device to engage head frames, feeding means to bring a head frame into coöperation with said holding device, means to feed additional parts into coöperation with said frame and to assemble the same into a sprinkler head and leak testing devices to engage and test said assembled head.

34. In machines for assembling automatic sprinkler heads, a support comprising a holding device to engage head frames, feeding means to bring a head frame into coöperation with said holding device, means to feed additional parts into coöperation with said frame and to assemble the same into a sprinkler head and testing devices to engage and test said assembled head.

35. In machines for assembling automatic sprinkler heads, a support comprising a holding device to engage head frames, a trip coöperating with said holding device, feeding means to bring a head frame into coöperation with said holding device, means to feed caps, retainers and holding means into coöperation with said frame and to assemble the same into a sprinkler head and load testing and leak testing devices to engage and test said assembled head, said load testing devices comprising gripping arms to engage the retainer on said head, means connected with said gripping arms to effect the minimum and maximum loading of the head, electrical detector devices indicating the yielding of the head under said maximum and minimum loadings and coöperating setting devices to automatically set the coöperating trip in rejection position in case of the unsatisfactory condition of said head.

36. In machines for assembling automatic sprinkler heads, a support comprising a holding device to engage head frames, a trip coöperating with said holding device, feeding means to bring a head frame into coöperation with said holding device, means to feed caps, retainers and holding means into coöperation with said frame and to assemble the same into a sprinkler head and load testing and leak testing devices to engage and test said assembled head, said load testing devices comprising gripping arms to engage the retainer on said head, means connected with said gripping arms to effect the minimum and maximum loading of the head, detector devices indicating the yielding of the head under said maximum and minimum loadings and coöperating setting devices to automatically set the coöperating trip in rejection position in case of the unsatisfactory condition of said head.

37. In machines for assembling automatic sprinkler heads, a support comprising a holding device to engage head frames, a trip coöperating with said holding device, feeding means to bring a head frame into coöperation with said holding device, means to feed additional parts into coöperation with said frame and to assemble the same into a sprinkler head and load testing devices to engage and test said assembled head, said load testing devices comprising gripping arms to engage said head, means connected with said gripping arms to effect the minimum and maximum loading of the head, detector devices indicating the yielding of the head under said maximum and minimum loadings and coöperating setting devices to automatically set the coöperating trip in rejection position in case of the unsatisfactory condition of said head.

38. In machines for assembling automatic sprinkler heads, a support comprising a holding device to engage head frames, feeding means to bring a head frame into coöperation with said holding device, means to feed additional parts into coöperation with said frame and to assemble the same into a sprinkler head and load testing devices to engage and test said assembled head, said load testing devices comprising engaging means to engage said head, means connected with said engaging means to effect the minimum and maximum loading of the head and detector devices indicating the unsatisfactory condition of said head.

39. In automatic sprinkler machines, a support comprising a holding device to engage sprinkler heads, a trip coöperating with said holding device, means to assemble the parts of a sprinkler head in connection with said holding device, load testing devices to engage and test said head, said load testing devices comprising gripping arms to engage the retainer on said head, means connected with said gripping arms to effect the minimum and maximum loading of the head, electrical detector devices indicating the yielding of the head under said maximum and minimum loadings, and coöperating setting devices to automatically set the coöperating trip in rejection position in case of the unsatisfactory condition of said head.

40. In automatic sprinkler machines, a support comprising a holding device to engage sprinkler heads, a trip coöperating with said holding device, means to assemble the parts of a sprinkler head in connection with said holding device, load testing devices to engage and test said head, said load testing devices comprising means to effect the minimum and maximum loading of the head, detector devices indicating the yielding of the head under said maximum and minimum loadings, coöperating setting devices to automatically set the coöperating trip in rejection position in case of the unsatisfactory condition of said head.

41. In automatic sprinkler machines, a support comprising a holding device to engage sprinkler heads, a trip coöperating with said holding device, means to assemble the parts of a sprinkler head in connection with said holding device, load testing devices to engage and test said head, said load testing devices comprising means to effect the loading of the head detector devices indicating the yielding of the head under said loadings, and coöperating setting devices to automatically set the coöperating trip in rejection position in csae of the unsatisfactory condition of said head.

42. In automatic sprinkler machines, a support comprising a holding device to engage sprinkler heads, feeding means to bring a head frame into coöperation with said holding device, load testing devices to engage and test said head, said load testing devices comprising means to effect the loading of the head, detector devices indicating the unsatisfactory condition of said head and sorting devices controlled by said trip to separate the rejected heads.

43. In machines for assembling automatic sprinkler heads, a support comprising a holding device to engage head frames, a trip coöperating with said holding device, feeding means to bring a head frame into coöperation with said holding device, means to feed caps, retainers and holding means into coöperation with said frame and to assemble the same into a sprinkler head and leak testing devices to engage and test said assembled head, said leak testing devices comprising a testing pipe adapted to be supplied with fluid under pressure and communicating with said holding device to transmit said pressure to said head, a needle reducing valve in said testing pipe, a pressure gage connected with said testing pipe between said reducing valve and said head, leak indicating means comprising electric contacts on said pressure gage to be actuated by unusual reduction of pressure, said leak indicating means comprising a leak magnet and a coöperating armature connected with said trip to automatically set the same in rejection position and a cut-off valve connected with said trip to simultaneously cut off the pressure from said head, and sorting devices controlled by said trip to separate the rejected heads.

44. In machines for assembling automatic sprinkler heads, a support comprising a holding device to engage head frames, a trip coöperating with said holding device, feeding means to bring a head frame into coöperation with said holding device, means to feed caps, retainers and holding means into coöperation with said frame and to assemble the same into a sprinkler head and leak testing devices to engage and test said assembled head, said leak testing devices comprising a testing pipe adapted to be supplied with fluid under pressure and communicating with said holding device to transmit said pressure to said head, a valve in said testing pipe, a pressure gage connected with said testing pipe between said reducing valve and said head, leak indicating means comprising electric contacts on said pressure gage to be actuated by unusual reduction of pressure, said leak indicating means comprising a leak magnet and a coöperating armature connected with said trip to automatically set the same in rejection position and sorting devices controlled by said trip to separate the rejected heads.

45. In machines for assembling automatic sprinkler heads, a support comprising a holding device to engage head frames, a trip coöperating with said holding device, feeding means to bring a head frame into coöperation with said holding device, means to feed additional parts into coöperation with said frame and to assemble the same into a sprinkler head and leak testing devices to engage and test said assembled head, said leak testing devices comprising a testing pipe adapted to be supplied with fluid under pressure and communicating with said holding device to transmit said pressure to said head, a pressure gage connected with said testing pipe adjacent said head, leak indicating means connected with said trip to automatically set the same in rejection position and sorting devices controlled by said trip to separate the rejected heads.

46. In machines for assembling automatic sprinkler heads, a support comprising a holding device to engage head frames, a trip coöperating with said holding device, feeding means to bring a head frame into coöperation with said holding device, means to feed additional parts into coöperation with said frame and to assemble the same into a sprinkler head and leak testing devices to engage and test said assembled head, said leak testing devices comprising a testing pipe adapted to be supplied with fluid under pressure and communicating with said holding device to transmit said pressure to said head, a pressure gage connected with said testing pipe adjacent said head, leak indicating means indicating the unsatisfactory condition of any of said heads.

47. In automatic sprinkler machines, a support comprising a holding device to engage sprinkler heads, means to assemble parts of a sprinkler head in connection with said holding device, a trip coöperating with said holding device and leak testing devices to engage and test said heads, said leak testing devices comprising a testing pipe adapted to be supplied with water under pressure and communicating with said holding device to transmit said pressure to said head, a needle reducing valve in said testing pipe, a pressure gage connected with said testing pipe between said reducing valve and said head, leak indicating means comprising electric contacts on said pressure gage to be actuated by unusual reduction of pressure, said leak indicating means comprising a leak magnet and a coöperating armature connected with said trip to automatically set the same in rejection position and a cut-off valve connected with said trip to simultaneously cut off the pressure from said head and sorting devices controlled by said trip to separate the rejected heads.

48. In automatic sprinkler machines, a support comprising a holding device to engage sprinkler heads, means to assemble parts of a sprinkler head in connection with said holding device, a trip coöperating with said holding device and leak testing devices to engage and test said heads, said leak testing devices comprising a testing pipe adapted to be supplied with water under pressure and communicating with said holding device to transmit said pressure to said head, a reducing valve in said testing pipe, a pressure gage connected with said testing pipe between said reducing valve and said head, leak indicating means comprising electric contacts on said pressure gage to be actuated by unusual reduction of pressure, said leak indicating means being connected with said trip to automatically set the same in rejection position and sorting devices controlled by said trip to separate the rejected heads.

49. In automatic sprinkler machines, a support comprising a holding device to engage sprinkler heads, means to assemble parts of a sprinkler head in connection with said holding device, a trip coöperating with said holding device and leak testing devices to engage and test said heads, said leak testing devices comprising a testing pipe adapted to be supplied with water under pressure and communicating with said holding device to transmit said pressure to said head, a pressure gage connected with said head, leak indicating means comprising electric contacts on said pressure gage to be actuated by unusual reduction of pressure, said leak indicating means being connected with said trip to automatically set the same in rejection position and sorting devices controlled by said trip to separate the rejected heads.

50. In automatic sprinkler machines, a support comprising a holding device to engage sprinkler heads, means to assemble parts of a sprinkler head in connection with said holding device, a trip coöperating with said holding device and leak testing devices to engage and test said heads, said leak testing devices comprising a testing pipe adapted to be supplied with water under pressure and communicating with said holding device to transmit said pressure to said head, a pressure gage connected with said head, leak indicating means comprising electric contacts on said pressure gage to be actuated by unusual reduction of pressure.

51. In machines for assembling automatic sprinkler heads, a movable carrier having holding devices to engage head frames, means to intermittently move said carrier to bring said head frames into coöperation with various stations, feeding devices to bring head frames into coöperation with the holding devices in said carrier, means to feed caps into coöperation with said head frames, retainer devices to assemble and feed retainers into coöperation with said head frames at one of said stations, said retainer devices comprising retainer and link guides, a pusher coöperating with said guides to engage the leading fusible link and push the same into the slot in the leading male retainer, a depressor to guide said link, a movable block connected to said pusher and having a shelf to support said male retainer, a pivoted detainer to hold said male retainer, means connected with said pusher to disengage said detainer from said retainer, a spring holder to releasably hold the leading female retainer in the path of said link and male retainer, means to actuate said pusher to force said link into position connecting said male and female retainers and to force the resulting assembled retainer into alinement with one of said heads, and a yielding alining stop engaging said retainer.

52. In machines for assembling automatic sprinkler heads, a movable carrier having holding devices to engage head frames, means to intermittently move said carrier to bring said head frames into coöperation with various stations, feeding devices to bring head frames into coöperation with the holding devices in said carrier, means to feed caps into coöperation with said head frames, retainer devices to assemble and feed retainers into coöperation with said head frames at one of said stations, said retainer devices comprising retainer and link guides, a pusher coöperating with said guides to engage the leading fusible link and push the same into the slot in the leading male retainer, a movable block connected to said pusher and having a shelf to support said male retainer, a detainer to hold said male retainer, means connected with said pusher to disengage said detainer from said retainer, a holder to releasably hold the leading female retainer in the path of said link and male retainer and means to actuate said pusher to force said link into position connecting said male and female retainers and to force the resulting assembled retainer into alinement with one of said heads.

53. In machines for assembling automatic sprinkler heads, a movable carrier having holding devices to engage head frames, means to intermittently move said carrier to bring said head frames into coöperation with various stations, feeding devices to bring head frames into coöperation with the holding devices in said carrier, means to feed caps into coöperation with said head frames, retainer devices to assemble and feed retainers into coöperation with said head frames at one of said stations, said retainer devices comprising a pusher coöperating with said guides to engage the leading fusible link and push the same into the slot in the leading male retainer, a detainer to hold said male retainer, means connected with said pusher to disengage said detainer from said retainer, a holder to releasably hold the leading female retainer in the path of said link and male retainer and means to actuate said pusher to force said link into position connecting said male and female retainers and to force the resulting assembled retainer into alinement with one of said heads.

54. In machines for assembling automatic sprinkler heads, a movable carrier having holding devices to engage head frames, means to intermittently move said carrier to bring said head frames into coöperation with various stations, feeding devices to bring head frames into coöperation with the holding devices in said carrier, means to feed caps into coöperation with said head frames, retainer devices to assemble and feed retainers into coöperation with said head frames at one of said stations, said retainer devices comprising a pusher to engage a fusible link and push the same into the slot in a retainer and means to actuate said pusher to force said link into position connecting said retainer with another retainer and to feed forward the resulting assembled retainer into alinement with one of said heads.

55. In machines for assembling automatic sprinkler heads, a movable carrier having holding devices to engage head frames, means to intermittently move said carrier to bring said head frames into cooperation with various stations, feeding devices to bring head frames into coöperation with the holding devices in said carrier, means to feed caps into coöperation with said head frames, retainer devices to assemble and feed retainers into coöperation with said head frames at one of said stations, said retainer devices comprising a pusher to engage a fusible link and push the same into engagement with a retainer and means to actuate said pusher to force said link into position connecting said retainer with another retainer and to feed forward the resulting assembled retainer into alinement with one of said heads.

56. In automatic sprinkler machines, retainer devices comprising retainer and link guides, a pusher coöperating with said guides to engage the leading fusible link and push the same into the slot in a retainer, a depressor to guide said link, a movable block connected to said pusher and having a shelf to support said retainer, a pivoted detainer to hold said retainer, means connected with said pusher to disengage said detainer from said retainer, a spring holder to releasably hold another retainer in the path of said link, means to actuate said pusher to force said link into position connecting said retainers and to feed forward the resulting assembled retainer into alinement with a sprinkler head, and a yielding alining stop engaging said retainer.

57. In automatic sprinkler machines, retainer devices comprising retainer and link guides, a pusher coöperating with said guides to engage the leading fusible link and push the same into coöperation with a retainer, a movable block connected to said pusher and having a shelf to support said retainer, a detainer to hold said retainer, means connected with said pusher to disengage said detainer from said retainer, a spring holder to releasably hold another retainer in the path of said link and means to actuate said pusher to force said link into position connecting said retainers and to feed forward the resulting assembled retainer into alinement with a sprinkler head.

58. In automatic sprinkler machines, retainer devices comprising a pusher to engage the leading fusible link and push the same into coöperation with a retainer, detainer to hold said retainer, means connected with said pusher to disengage said detainer from said retainer, a holder to releasably hold another retainer in the path of said link and means to actuate said pusher to force said link into position connecting said retainers and to feed forward the resulting assembled retainer into alinement with a sprinkler head.

59. In automatic sprinkler machines, retainer devices comprising means to engage a fusible link and relatively move the same into coöperation with a retainer, means to bring said link into coöperation with another retainer to releasably hold said retainers and means to feed forward the resulting assembled retainer.

60. In automatic sprinkler machines, retainer devices comprising a pusher to engage a fusible link and push the same into the slot in a retainer and means to actuate said pusher to force said link into position connecting said retainer with another retainer and to feed forward the resulting assembled retainer.

61. In machines for assembling automatic sprinkler heads, a movable carrier having a series of chuck gears and connected threaded holding devices to engage the threaded necks of head frames, trips coöperating with said holding devices, means to intermittently move said carrier to bring the head frames into coöperation with various stations, feeding and inserting devices to insert head frames into said holding devices in said carrier, said feeding and inserting devices comprising a feed chute and belt to feed a line of head frames, an elevator, a turner pivoted to said elevator and adapted to receive the leading head from said chute, a gripping clamp on said turner to clamp a frame therein when said elevator is raised, a turning guide to swing said turner as it is raised, a centering spring on said elevator to engage said frames and resiliently force their threaded necks into said holding devices and an inserting gear on said elevator to rise into engagement with said chuck gears, means to feed caps and additional parts into coöperation with said head frames at said stations, and to assemble the same into heads and place said caps under substantially uniform load, load testing and leak testing devices to engage and test said assembled heads and automatically set the coöperating trips in rejection position in case of the unsatisfactory condition of said heads, head locking devices coöperating with said carrier and controlled by said trips, disengaging means comprising a disengaging gear disengageably coöperating with said chuck gears to disengage said heads from said carrier and sorting devices controlled by said trips to separate the rejected heads.

62. In machines for assembling automatic sprinkler heads, a movable carrier having a series of chuck gears and connected threaded holding devices to engage the threaded necks of head frames, trips coöperating with said holding devices, feeding and inserting devices to insert head frames into said holding devices in said carrier, said feeding and inserting devices comprising a feed chute and belt to feed a line of head frames, an elevator, a turner pivoted to said elevator and adapted to receive the leading head from said chute, a gripping clamp on said turner to clamp a frame therein when said elevator is raised, a turning guide to swing said turner as it is raised, a centering spring on said elevator to engage said frames and resiliently force their threaded necks into said holding device and an inserting gear on said elevator to rise into engagement with said chuck gears, means to feed caps and additional parts into coöperation with said head frames at said stations, and to assemble the same into heads and place said caps under substantially uniform load, testing devices to engage and test said assembled heads and automatically set the coöperating trips in rejection position in case of the unsatisfactory condition of said heads, head locking devices coöperating with said carrier and controlled by said trips, disengaging means comprising a disengaging gear disengageably coöperating with said chuck gears to disengage said heads from said carrier and sorting devices controlled by said trips to separate the rejected heads.

63. In machines for assembling automatic sprinkler heads, a movable carrier having a series of chuck gears and connected threaded holding devices to engage the threaded necks of head frames, trips coöperating with said holding devices, feeding and inserting devices to insert head frames into said holding devices in said carrier, said feeding and inserting devices comprising an elevator, a turner pivoted to said elevator and adapted to receive the leading head, a gripping clamp on said turner to clamp a frame therein when said elevator is raised, a turning guide to swing said turner as it is raised, a centering spring on said elevator to engage said frames and resiliently force their threaded necks into said holding devices and an inserting gear on said elevator to rise into engagement with said chuck gears, means to feed caps and additional parts into coöperation with said head frames at said stations, and to assemble the same into heads and place said caps under substantially uniform load, testing devices to engage and test said assembled heads and automatically set the coöperating trips in rejection position in case of the unsatisfactory condition of said heads, disengaging means comprising a disengaging gear disengageably coöperating with said chuck gears to disengage said heads from said carrier and sorting devices controlled by said trips to separate the rejected heads.

64. In machines for assembling automatic sprinkler heads, a movable carrier having a series of chuck gears and connected threaded holding devices to engage the threaded necks of head frames, trips coöperating with said holding devices, feeding and inserting devices to insert head frames into said holding devices in said carrier, said feeding and inserting devices comprising an elevator, a turner pivoted to said elevator and adapted to receive the leading head, a gripping clamp on said turner to clamp a frame therein when said elevator is raised, a turning guide to swing said turner as it is raised, and an inserting gear on said elevator to rise into engagement with said chuck gears, means to feed caps and additional parts into coöperation with said head frames at said stations, and to assemble the same into heads and place said caps under substantially uniform load, testing devices to engage and test said assembled heads and automatically indicate the unsatisfactory condition of said heads and disengaging means comprising a disengaging gear disengageably coöperating with said chuck gears to disengage said heads from said carrier.

65. In machines for assembling automatic sprinkler heads, a movable carrier having a series of chuck gears and connected threaded holding devices to engage the threaded necks of head frames, and feeding and inserting devices to insert head frames into said holding devices in said carrier, said feeding and inserting devices comprising a feed chute and belt to feed a line of head frames, an elevator, a turner mounted on said elevator and adapted to receive the leading head from said chute, a gripping clamp on said turner to clamp a frame therein when said elevator is raised, a turning guide to swing said turner as it is raised, a centering spring on said elevator to engage said frames and resiliently force their threaded necks into said holding devices and an inserting gear on said elevator to rise into engagement with said chuck gears.

66. In machines for assembling automatic sprinkler heads, a movable carrier having a series of chuck gears and connected threaded holding devices to engage the threaded necks of head frames, and feeding and inserting devices to insert head frames into said holding devices in said carrier, said feeding and inserting devices comprising an elevator, a turner mounted on said elevator and adapted to receive the leading head, a gripping clamp on said turner to clamp a frame therein when said elevator is raised, a turning guide to swing said turner as it is raised and an inserting gear on said elevator to rise into engagement with said chuck gears.

67. In machines for assembling automatic sprinkler heads, a movable carrier having a series of chuck gears and connected threaded holding devices to engage the threaded necks of head frames, means to intermittently move said carrier to bring the head frames into coöperation with various stations and feeding and inserting devices to insert head frames into said holding devices in said carrier, said feeding and inserting devices comprising means to feed a line of head frames, a clamping means adapted to receive the leading head from said chute, and carry its threaded neck into coöperation with said holding devices, a centering spring to engage said frames and resiliently force their threaded necks into said holding means and an inserting gear to move into engagement with said chuck gears and means to feed caps and retainers and holding means into coöperation with said head frames at said stations, and to assemble the same into heads and place said caps and retainers under substantially uniform load.

68. In machines for assembling automatic sprinkler heads, a movable carrier having a series of chuck gears and connected threaded holding devices to engage the threaded necks of head frames, means to intermittently move said carrier to bring the head frames into coöperation with various stations and feeding and inserting devices to insert head frames into said holding devices in said carrier, said feeding and inserting devices comprising means to feed a line of head frames, clamping means adapted to receive the leading head from said chute and carry its threaded neck into coöperation with said holding devices, and an inserting gear to move into engagement with said chuck gears.

JOHN R. HAMILTON.

Witnesses:
  JESSIE B. KAY,
  G. BRUMMERHOP.